United States Patent
Lin et al.

(10) Patent No.: US 7,280,506 B2
(45) Date of Patent: Oct. 9, 2007

(54) APPARATUS FOR CONTROLLING MULTI-MODE RADIO ACCESS AND METHOD FOR THE SAME

(75) Inventors: Tzu-Ming Lin, Taipei (TW); Meng-Hong Chen, Taipei (TW); Juin-Jia Dai, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 729 days.

(21) Appl. No.: 10/749,554

(22) Filed: Jan. 2, 2004

(65) Prior Publication Data

US 2005/0068965 A1 Mar. 31, 2005

(30) Foreign Application Priority Data

Aug. 26, 2003 (TW) ................. 92123494 A

(51) Int. Cl.
*H04Q 7/00* (2006.01)
*H04Q 7/20* (2006.01)

(52) U.S. Cl. ............... 370/331; 370/332; 370/333; 370/338; 370/348; 455/452.1; 455/422

(58) Field of Classification Search ............ 455/452.2, 455/422, 436, 438; 370/331, 332, 236, 338, 370/348
See application file for complete search history.

(56) References Cited

U.S. PATENT DOCUMENTS

| | | | |
|---|---|---|---|
| 6,205,128 B1 | 3/2001 | Le | |
| 6,243,581 B1 | 6/2001 | Jawanda | |
| 7,006,472 B1* | 2/2006 | Immonen et al. | 370/332 |
| 7,162,236 B2* | 1/2007 | Dorenbosch et al. | 455/432.1 |
| 2004/0038685 A1* | 2/2004 | Nakabayashi | 455/452.2 |
| 2004/0170149 A1* | 9/2004 | Lee | 370/338 |
| 2006/0009187 A1* | 1/2006 | Sheynman et al. | 455/318 |

OTHER PUBLICATIONS

Medium Access Control Enhancements for Quality of Service; Jul. 2003; IEEE; Std 802.11e/D5.0; p. I-p. VIII.
QoS Concept and Architecture; Oct. 2001; 3GPP TS 23.107 V4.2.0; p. 1-p. 38.
Tsao et al.; Design and Implementation of Software Framework for Software Defined Radio System; 2002 IEEE; p. 2395-p. 2399.
Mehta et al.; Reconfigurable Terminals: An Overview of Architectural Solutions; Aug. 2001; IEEE Communications Magazine; p. 82-p. 89.
Becchetti et al.; Enhancing IP s rvice Provision over Heterogeneous Wireless Networks: A path t ward 4G; Aug. 2001; IEEE Communications Magazine; p. 74-p. 81.

* cited by examiner

*Primary Examiner*—William Trost
*Assistant Examiner*—Julio Perez
(74) *Attorney, Agent, or Firm*—Rabin & Berdo, P.C.

(57) ABSTRACT

A method and apparatus for controlling multi-mode radio access, more particularly, to a method and apparatus that supports multi-mode reconfigurable, quality of service (QoS) and seamless handoff in different radio systems so as to provide wire-line like QoS guarantee. The apparatus includes a network layer, a radio adaptation layer, a radio system layer and a physical layer. Therein, the radio adaptation layer is used to control the radio modules disposed in the radio system layer to support the QoS needed in the upper layer. The radio adaptation layer is also used to build up, correct and seamlessly change the radio link, and ensures that the packets from the upper layers can be orderly delivered to the lower layer with preset QoS.

26 Claims, 11 Drawing Sheets

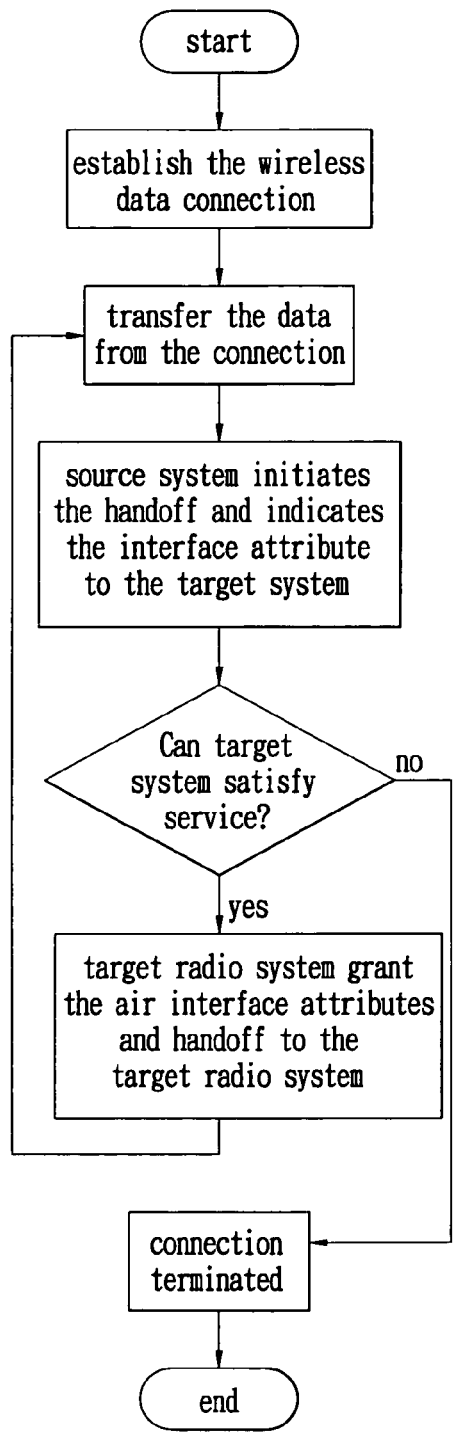
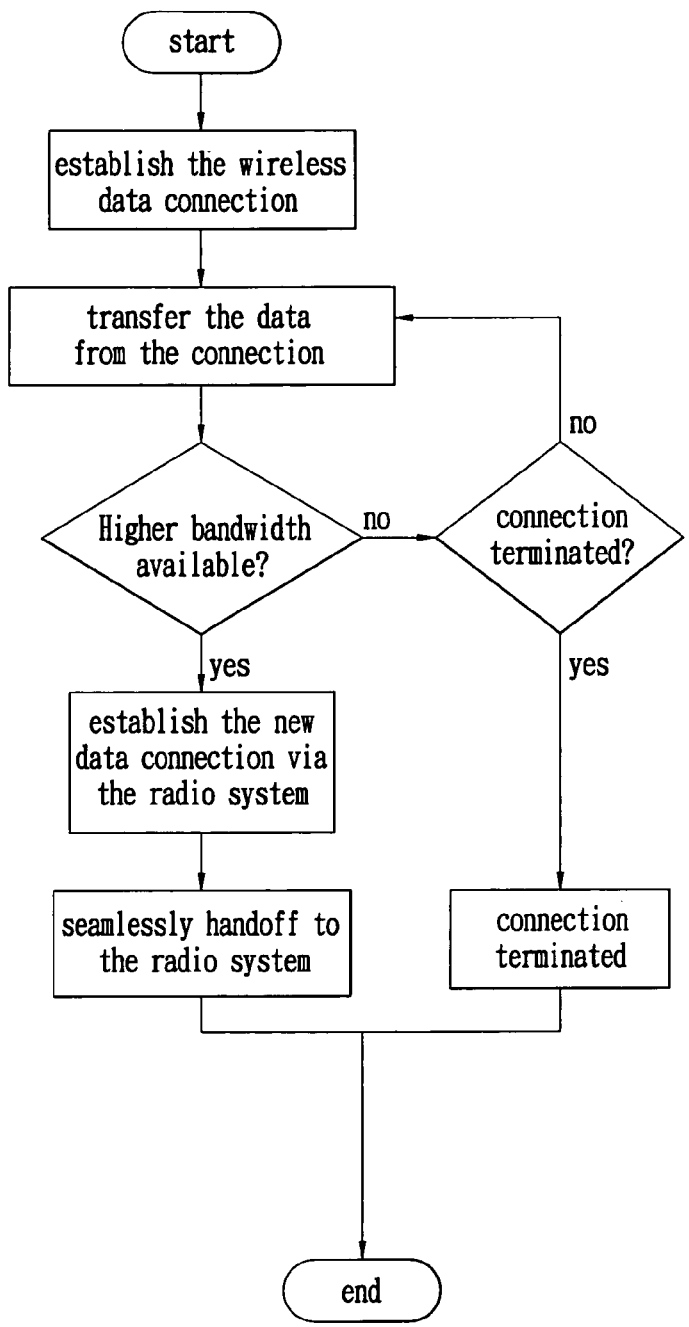
FIG. 1A
PRIOR ART
FIG. 1B
PRIOR ART

APPARATUS FOR CONTROLLING MULTI-MODE RADIO ACCESS AND METHOD FOR THE SAME

FIELD OF THE INVENTION

The present invention is directed to an apparatus for controlling multi-mode radio access and method thereof, and more particularly, to a system and a method that supports multi-mode reconfigurable media access control, quality of service (QoS) and seamless handoff in different radio systems so as to provide wire-line like QoS guarantee.

BACKGROUND OF THE INVENTION

As for conventional wireless communication apparatuses, in recent years, the Wireless Lan cards designed according to IEEE 802.11 protocol can be found at the market easily. The Wireless Lan card can be installed in a common personal computer (PC) or a portable computer. Via an access point (AP), the Wireless Lan card can communicate with a wired data network so that a user can use the Wireless Lan card to surf the network in a wireless manner.

In the recent development of the radio systems, the main issues include: QoS maintenance between different radio systems, management of radio modules, seamless handoff between radio system design for the beyond third generation (B3G) network.

In the field of QoS, some organizations are trying to define their own standards for radio systems, e.g. IEEE 802.11E protocol for wireless local area networks (WLAN), 3GPP TS23.107 for wideband code division multiple access (WCDMA) systems, etc. However, most of these standards are defined with individual QoS criteria adapted for their own wireless network structures. These standards only can guarantee a specific QoS at wireless terminals, but they can hardly support a QoS of wired networks. Hence, they can't satisfy the requirements of the end-to-end QoS.

In order to reach the end-to-end QoS guarantee, an interworking unit is usually used between different systems for communication and maintaining the QoS. However, different radio systems possess different network features and an additional interworking unit should be used for mapping the requirements of different QoS. Hence, this method is costly and easily induces the degradation of QoS during executing the mapping process.

As per seamless handoff, please refer to FIG. 1A, which is disclosed in "Enhanced handoff signaling for high speed data and multimedia," U.S. Pat. No. 6,205,128. This patent discloses a mechanism for handoff while the radio communication system finds the signal is too weak to maintain the connection quality. Once handoff is needed, the source system will first inform the wireless apparatus. Then, the wireless apparatus will execute the handoff process when the target system is ready. Please also refer to FIG. 1B, which is disclosed in "Method and system for seamless handoff between radio networks with a mobile terminal," U.S. Pat. No. 6,243,581. Some techniques can be used to search a more suitable radio link to make the wireless apparatus able to transfer data in the radio link with higher bandwidth after handoff.

As per multi-mode reconfigurable technology, please refer to FIG. 2, which illustrates an operation flowchart of a soft defined radio system mentioned in "Design and implementation of software framework for software defined radio system," VTC 2002-Fall, Volume: 4, 2002. By employing the mechanism of the this system, a wireless communication apparatus will first measure the magnitude of received signals and then decide if the software and hardware modules should be changed to adapt to a different system. However, the problems about seamless handoff are not considered in this system architecture. Hence, the transmission of this system will be interrupted during the module changing process.

Moreover, in "Reconfigurable terminals: an overview of architectural solution," IEEE Communications Magazine, Vol. 39 Issue: 8, another system architecture designed in TRUST project of IST is introduced. This system architecture has mode monitoring, mode switching and software download mechanisms and reconfigurable baseband system structure. By employing this architecture, the mode monitoring mechanism will decide which radio system should be connected to when the wireless apparatus is actuated. Subsequently, the mode monitoring mechanism will decide if the wireless apparatus should be adjusted to connect with another system during its movement and then adjust the radio system via the mode switching and software download mechanisms. This reference paper also mentions the problem of service interruption occurred during mode switching due to there is only one wireless transceiver available in the hardware and recommends to employ two transceivers in the hardware to resolve this problem.

As per the radio system architecture beyond third generation, please refer to FIG. 3, a wireless application layer (WAL) is inserted between the network layer and the physical layer. The wireless application layer includes a WAL coordinator, a plurality of radio modules, a traffic control module and a logical link control translate module.

The WAL coordinator is used to recognize the networks the packets belong to and then invoke the radio modules to process the packets. Subsequently, the processed packets will be delivered to the traffic control module for scheduling. Finally, via the logical link control translate module, the packets will be passed to the physical layer for transmission. However, this system architecture is only suited to use in the radio systems with similar attributes, this system architecture can't be used to coordinate and communicate with the radio modules if the radio systems have completely different media access control mechanisms. Besides, this system architecture can't support seamless handoff due to this system architecture can only control a radio module at a time.

As mentioned above, in the prior art, QoS, multi-mode reconfigurable and seamless handoff mechanisms and system architecture beyond third generation have been proposed. However, the wire-line like QoS can't be reached by improving one or two of these techniques. For instance, real-time multimedia transmission can't be reached without QoS technique; the wireless apparatus can only transfer data in a single radio system without multi-mode reconfigurable technique and hence the wireless apparatus can't access the network anytime and anywhere; the QoS will be degraded and even interrupted during handoff process without seamless handoff technique.

Accordingly, as discussed above, the conventional wireless communication apparatuses still have some drawbacks that could be improved. The present invention aims to resolve the drawbacks in the prior art.

SUMMARY OF THE INVENTION

An objective of the present invention is to provide an apparatus and method for controlling multi-mode radio access, which supports multi-mode reconfigurable, QoS and seamless handoff in different radio systems so as to provide wire-line like QoS guarantee.

Another objective of the present invention is to provide an apparatus and method for controlling multi-mode radio access, which make a user able to use a single apparatus to access different radio systems via different radio access techniques.

For reaching the objectives above, the present invention provides an apparatus for controlling multi-mode radio access, which includes a network layer, a radio adaptation layer, a radio system layer and a physical layer. Therein, the radio adaptation layer is used to control the radio modules of the radio system layer to support the QoS needed in the upper layer. The radio adaptation layer is in charge of building up, correcting and seamless changing the radio link and used to make sure that data can be delivered to the lower layer orderly according to predetermined QoS requirements. The phrase "seamless" means low packet loss rate and low packet delay.

The present invention also provides a method for controlling multi-mode radio access, which includes a packet transmission process and a seamless handoff process. Therein, the packet transmission process includes: recognizing a format of a received packet; establishing a corresponding radio link according to parameters of the received signaling packet and present network resources, and setting corresponding parameters of a traffic controller; and performing scheduling according to the set parameters and the classes of QoS and then sending out the received data packet orderly.

Furthermore, the seamless handoff process includes: determining if handoff is necessary according to the status of the present radio link; switching to a new radio link and releasing an old radio link; establishing the radio link with suitable QoS; setting corresponding parameters of a traffic controller; and inform the upper layer the variation of the new radio link.

Numerous additional features, benefits and details of the present invention are described in the detailed description, which follows.

BRIEF DESCRIPTION OF THE DRAWINGS

FIG. 1a is an operation flowchart of a handoff process according to the prior art.

FIG. 1b is an operation flowchart of another handoff process according to the prior art.

DETAILED DESCRIPTION

Figure 2:
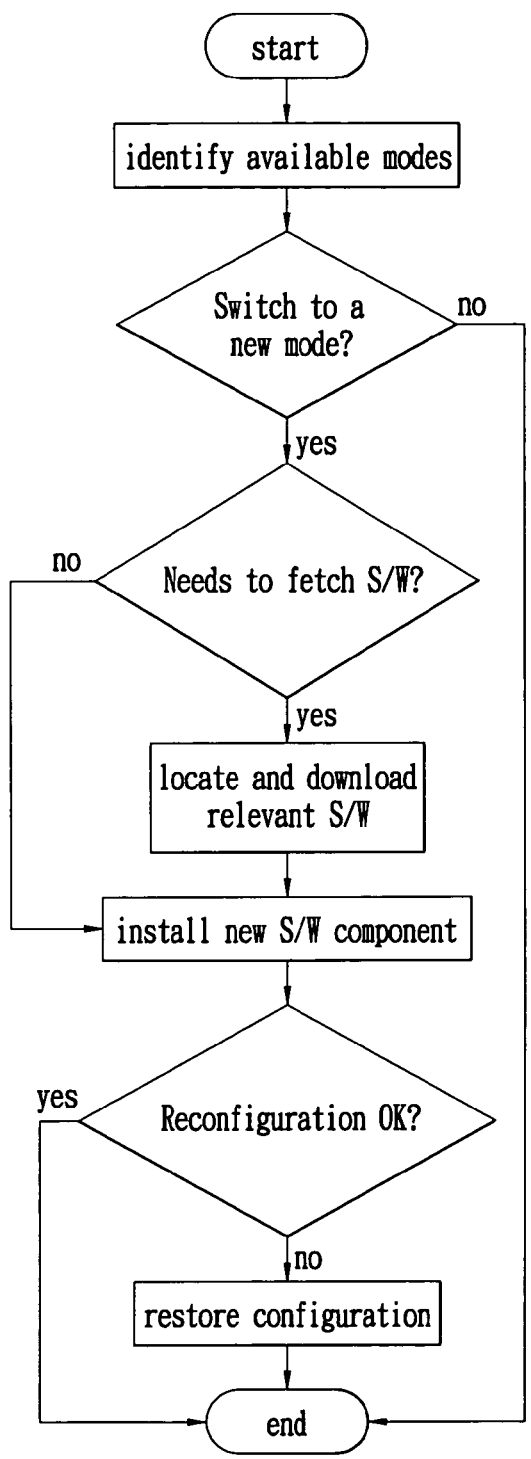
FIG. 2 is an operation flowchart of a soft defined radio system according to the prior art.
Figure 3:
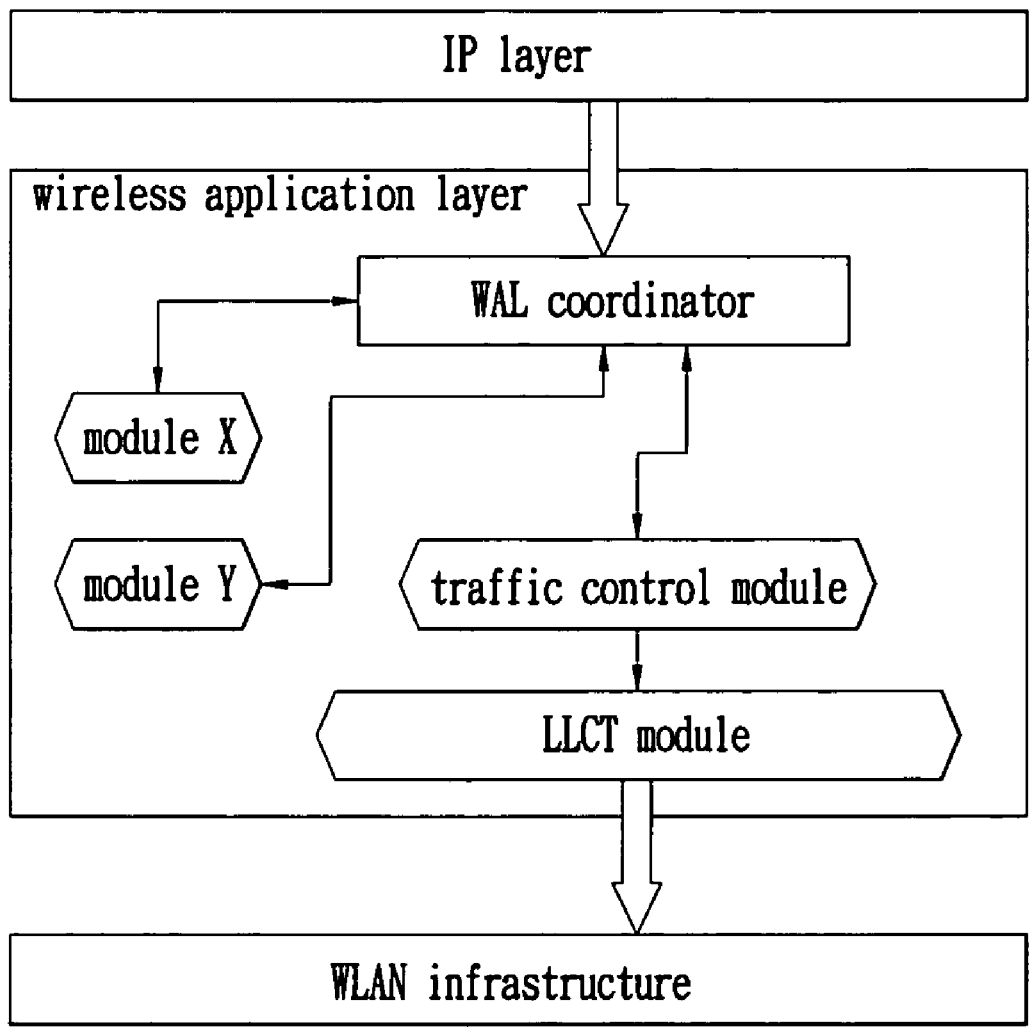
FIG. 3 is a schematic diagram of a radio system architecture beyond third generation according to the prior art.
Figure 4:
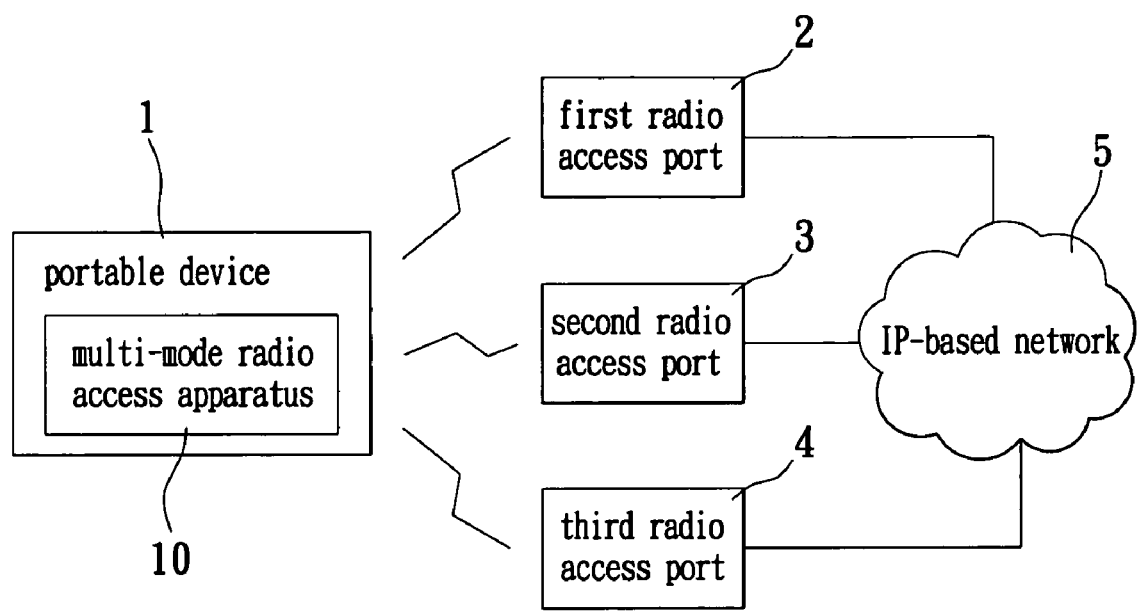
FIG. 4 is a schematic diagram of a multi-mode radio access apparatus complied with the present invention.

Please refer to FIG. 4, which is a schematic diagram of a multi-mode radio access apparatus complied with the present invention. The multi-mode radio access apparatus 10 of the present invention can be installed into a portable device 1, e.g. notebook computer. The portable device 1 can use the multi-mode radio access apparatus 10 to connect with the first radio access port 2, second radio access port 3 and third radio access port 4 to communicate with IP-based network ("IP" is the abbreviation of "Internet Protocol"). In practice, the number of radio access port is not limited and the first radio access port 2, second radio access port 3 and third radio access port 4 can use different radio access techniques. We should emphasize that the order and number of the radio systems illustrated in FIG. 4 are not limited. The number of the radio systems can be one or multiple.

Figure 5:
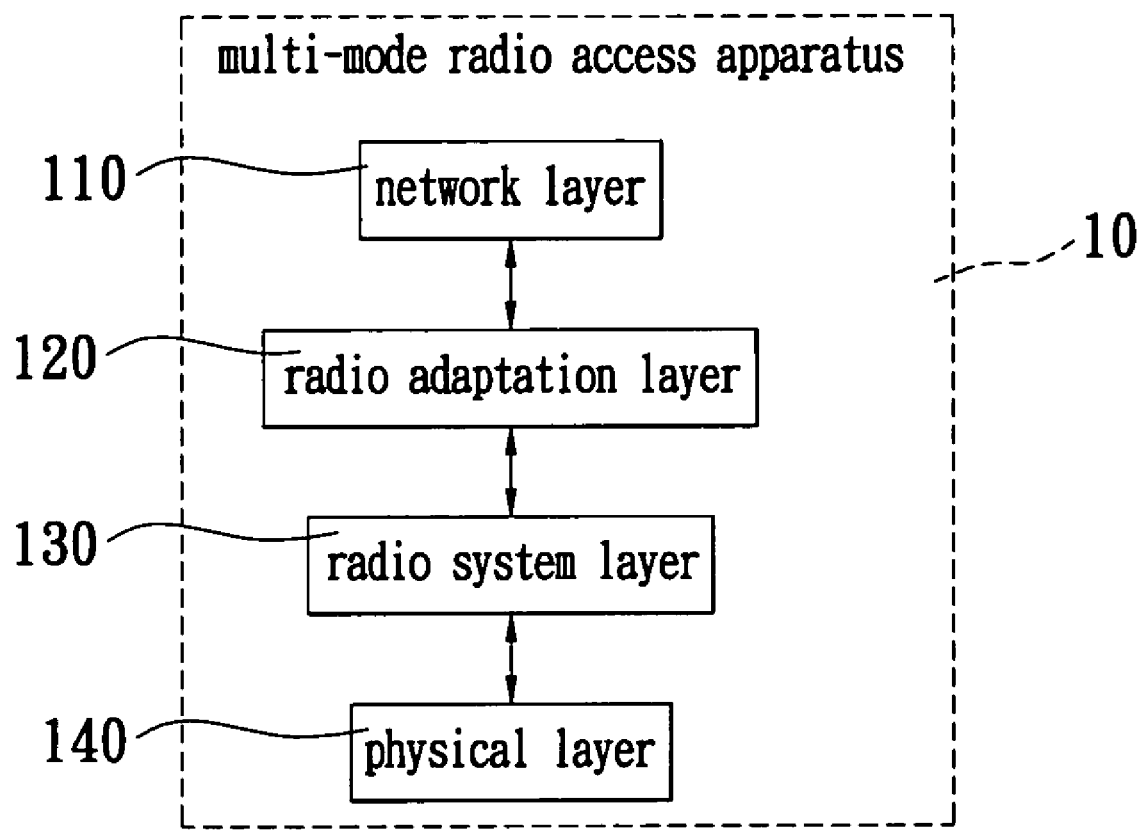
FIG. 5 shows a schematic diagram of an internal structure of the multi-mode radio access apparatus complied with the present invention.
Figure 6:
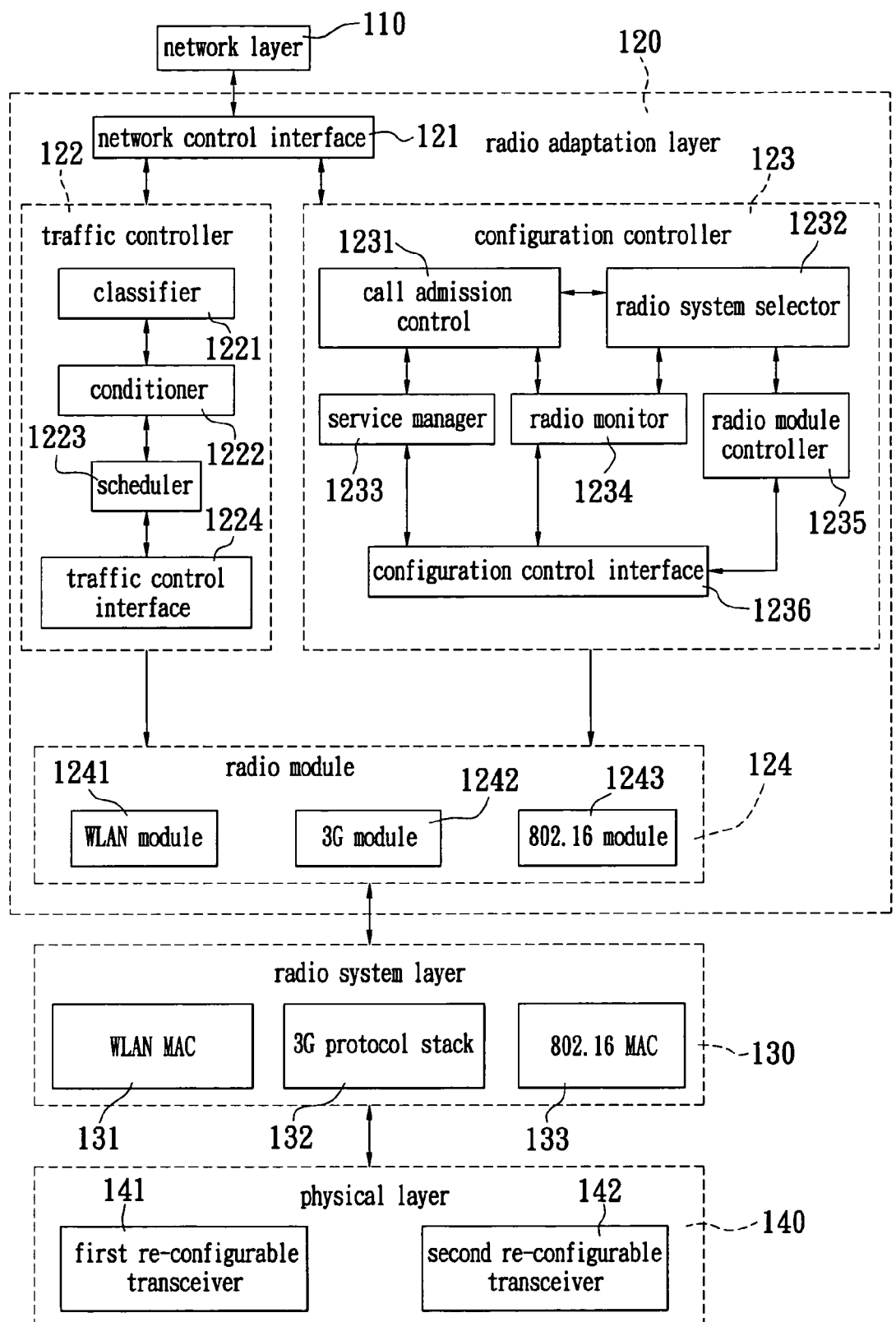
FIG. 6 shows a detailed block diagram of the internal structure of the multi-mode radio access apparatus complied with the present invention.

Please refer to FIGS. 5 and 6. FIG. 5 shows a schematic diagram of an internal structure of the multi-mode radio access apparatus 10 and FIG. 6 shows a detailed block diagram of the internal structure of the multi-mode radio access apparatus 10. In FIG. 5, the multi-mode radio access apparatus 10 includes a network layer 110, a radio adaptation layer 120, a radio system layer 130 and a physical layer 140.

The network layer 110 is used to support the application program of upper layer to provide the QoS mechanism of conventional Internet. Beside, the network layer 110 is also used to resolve the problems resulted from roaming within different wireless network systems. This layer has following functions.

The network layer 110 can use mobile IP to resolve the problems resulted from roaming within different wireless network systems. By employing mobile IP, the multi-mode radio access apparatus 10 can get a Care-of-Address (COA) during roaming and transfer data via the COA.

Regarding the portion of QoS, the network layer 110 can support IntServ, DiffServ or other QOS mechanisms. For instance, the network layer 110 can use RSVP protocol of IntServ to build up a preserved path in a network supporting IntServ or use DiffServ Core Point (DSCP) mechanism of DiffServ to mark packets so as to make the packets be transferred with predetermined QoS in a network supporting DiffServ.

As for the QoS mechanisms originally employed at the wired end in the network only, they can be supported in the radio adaptation layer 120 to make sure that the QoS in the network layer 110 can also be reached in different radio links. Hence, the QoS can be the same in the different layers of the multi-mode radio access apparatus 10

The radio adaptation layer 120 is mainly used to control the radio modules of the radio system layer 130 to provide radio links with the QoS needed in the upper layer. The radio adaptation layer 120 is in charge of building up, correcting and seamless changing the radio link and used to make sure that data can be delivered to the lower layer orderly according to predetermined QoS requirements when there are data ready to send in the upper layer.

The radio adaptation layer 120 also integrates with other QoS mechanisms originally used at the wired end in the network only. The radio adaptation layer 120 can coordinate the QoS of the upper layer and lower layer. On one hand, the radio adaptation layer 120 can cooperate with the IntServ and DiffServ mechanisms of user's wireless devices; on the other hand, the radio adaptation layer 120 also can cooperate with the IntServ and DiffServ mechanisms of the wired network.

As shown in FIG. 6, the radio adaptation layer 120 has a network control interface 121, a traffic controller 122, a configuration controller 123 and a radio module 124. Therein, the network control interface 121 is a unified interface capable of cooperating with various application programs of upper layers. The network control interface 121 is in charge of analyzing packets from the network layer 110 and able to recognize the QoS requirements and classifications of the packets. After recognition process, the network control interface 121 will classify the packets and send the data and signaling packets to the traffic controller 122 and configuration controller 123, respectively.

The configuration controller 123 is used to control and build up radio links and then set parameters of the traffic controller 122. The configuration controller 123 has a call admission control 1231, a radio system selector 1232, a service manager 1233, a radio monitor 1234, a radio module controller 1235 and a configuration control interface 1236.

The call admission control 1231 illustrated in FIG. 6 is in charge of managing the resource of wireless networks. The call admission control 1231 is used to determine if a radio link can be built up by employing the available radio resource according to the QoS requirements. The call admission control 1231 can also pre-build or rebuild a radio link according to different requirements and communicate with the radio system selector 1232 and radio monitor 1234 to obtain the last information about radio resource. After accepting the requirement of connection, the service manager 1233 set the parameters of the traffic controller 122 to make the traffic controller 122 deliver the data packets in accord with the QoS requirements.

The radio system selector 1232 of the configuration controller 123 is used to analyze the status of the wireless networks according to the radio link information from the radio monitor 1234. The radio system selector 1232 will choose a most suitable radio link and perform seamless handoff for a user. At the same time, the radio system selector 1232 will also adjust itself dynamically in accordance with the radio link and make the call admission control 1231 and radio module controller 1235 to perform corresponding actions.

The service manager 1233 is able to perform commands from the call admission control 1231 to manage and control the components of the traffic controller 122. The service manager 1233 is also used to control the radio module 124 to build up or change the radio links.

The radio monitor 1234 of the configuration controller 123 is in charge of monitoring the radio links. The radio monitor 1234 will make the radio module 124 to report back periodically or while being abnormal. Then, the radio monitor 1234 will provide the information of the present status of the radio link to the call admission control 1231 and the radio system selector 1232 for determining if a connection should be built up and if handoff is needed.

The radio module controller 1235 is used to load protocol software corresponding to accessed radio systems into the radio module 124. The configuration control interface 1236 acts as a unified interface between the configuration controller 123 and radio module 124.

The traffic controller 122 shown in FIG. 6 is used to control the traffic of the data packets to fulfill the QoS requirements. The traffic controller 122 has a classifier 1221, a conditioner 1222, a scheduler 1223 and a traffic control interface 1224. Therein, the classifier 1221 will classify the data packets sent from the network control interface 121. If the data packets are IntServ packets, the classifier 1221 will classify them in accord with their radio links. After classified, the packets will be sent to the corresponding queues, respectively. Then, the conditioner 1222 will perform traffic control.

Moreover, the conditioner 1222 is used to manage the queues of the packets. The conditioner 1222 has a meter for measuring according to the data attributes and influencing parameters of other components, a dropper for dropping packets according the requirements of QoS, and a shaper for retarding the transmission of packets according the requirements of QoS (these components are not shown in FIG. 6). The schedulers 1223 is used to schedule the queues of different classifications according to the parameters set by the service manager 1233 and pass the packets to the radio module 124 for transmission. The traffic control interface 1224 acts as a unified interface between the traffic controller 122 and the radio module 124.

The radio module 124 is used for transforming the format of the data packets before transmitting in different radio systems. The radio module 124 is also used to provide a radio link with suitable QoS for the traffic controller 122 and make the links of the application programs of the upper layer able to map to the radio links of the lower layer in a one-to-one or one-to-multiple manner. Further, the radio module 124 also provides some functions, such as monitoring or power saving, for the configuration controller 123 to change or set the radio module 124. The radio module 124 includes a wireless local area network (WLAN) module 1241, a 3G module 1242 and a 802.16 module 1243. In practice, the radio module 124 can further include a bluetooth module or the modules employing other radio access techniques.

The radio system layer 130 has a WLAN media access controller (MAC) 131, a 3G protocol stack 132 and a 802.16 MAC 133. In practice, the radio system layer 130 can further include a bluetooth MAC or the MACs employing other radio access techniques. Via these media access controllers, the multi-mode radio access apparatus 10 can use various radio access ports, such as first radio access port 2, second radio access port 3, etc., to access the IP-based network 5.

Furthermore, as an example only, the physical layer 140 shown in FIG. 6 has a first reconfigurable transceiver 141 and a second reconfigurable transceiver 142. Both of the first reconfigurable transceiver 141 and second reconfigurable transceiver 142 can be re-configured to adapt to different radio systems. In practice, the physical layer 140 of the present invention can have a single reconfigurable transceiver only. Besides, the physical layer 140 can also have a non-reconfigurable transceiver.

During handoff, if the physical layer 140 has two or more transceivers, the physical layer 140 can use one transceiver to communicate with a radio system via a built radio link and use another one to connect with other radio systems simultaneously. Then, the physical layer 140 will be disconnected from the former radio system only after built up another radio link. By this way, the multi-mode radio access apparatus 10 can perform handoff seamlessly without any delay or disconnection from external networks.

In order to reach seamless handoff, requirements of QoS of Internet and functions of radio link, the multi-mode radio access method of the present invention includes a multi-mode reconfigurable control process, a packet-transmitting process (mainly for providing a QoS guaranteed radio link), a seamless handoff process and a radio link releasing process.

In the multi-mode reconfigurable control process, the configuration controller 123 uses the radio monitor 1234 to monitor the signals of radio links and the statuses of communication. Once problems induced in the radio links happen, the configuration controller 123 will change the setting of the links or perform handoff. The configuration controller 123 can use the radio system selector 1232 to make a decision in accord with the requirements of QoS, and then use the service manager 1233 to change the setting of the radio module 124 or use the radio module controller 1235 to change the radio module 124 timely. Thereby, the configuration controller 123 can provide a user to change the setting of media access control dynamically and repeatedly.

Figure 7:
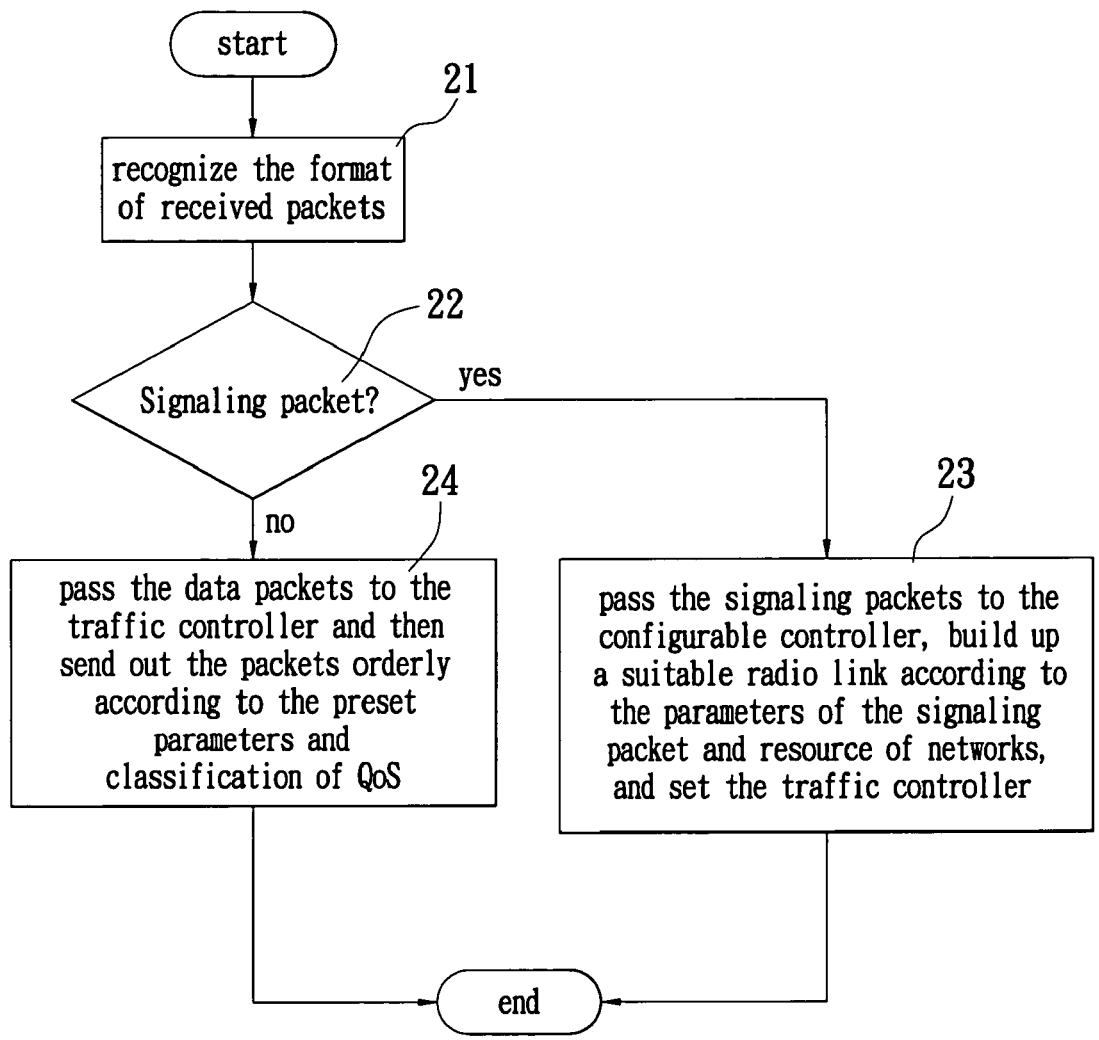
FIG. 7 is an operative flowchart of the packet-transmitting process complied with the present invention.

As for providing a QoS guaranteed radio link, please refer to FIG. 7, which is an operative flowchart of the packet-transmitting process complied with the present invention. In the beginning, when the network control interface 121 receives packets from the network layer 110, the network control interface 121 will recognize the format of the received packets so as to identify the QoS mechanism and distinguish the packets into signaling packets and data packets (steps 21 and 22). The network control interface 121 will pass the signaling packets to the configuration controller 123 and pass the data packets to the traffic controller 122.

When the configuration controller 123 receives a signaling packet, configuration controller 123 will use the call admission control 1231 to decide if building up a radio link is necessary according to the parameters of the signaling packet and the resource of the networks. Once deciding to build up a radio link, configuration controller 123 will use the service manager 1233 to control the radio system layer 130 to change the setting of the media access control for forming a suitable radio link or increase a new radio link. Then, configuration controller 123 will set the traffic controller 122 with corresponding parameters (step 23).

On the other hand, when the traffic controller 122 receives a data packet, the traffic controller 122 will schedule the packet in accordance with the preset parameters and the classification of QoS and then send out the packet orderly to fulfill the requirements of QoS (step 24).

Figure 8:
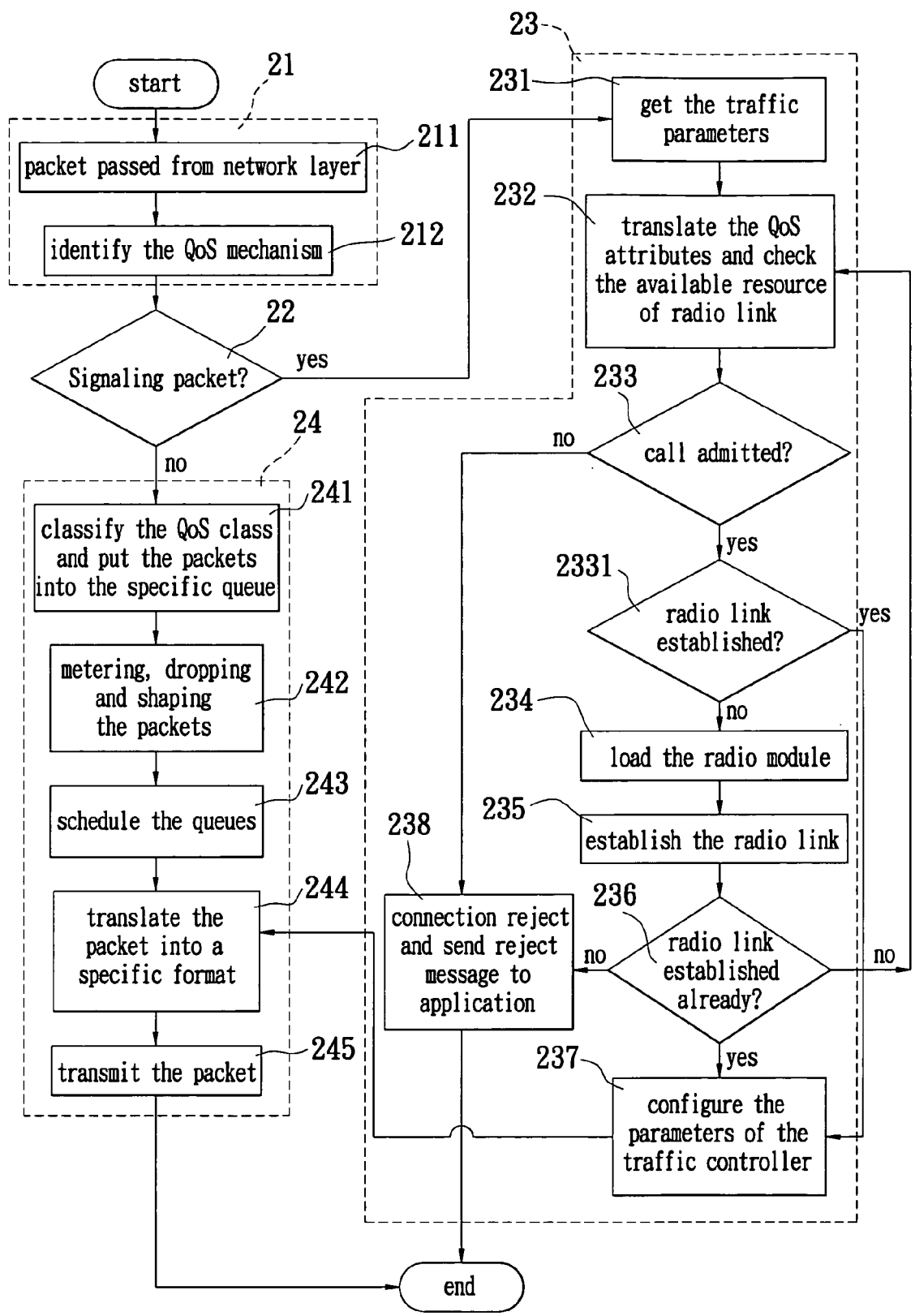
FIG. 8 is a detailed operative flowchart of the packet-transmitting process complied with the present invention.

Please refer to FIG. 8, which is a detailed operative flowchart of the packet-transmitting process complied with the present invention. Initially, the multi-mode radio access apparatus 10 is actuated, and then the network control interface 121 will start to receive signaling or data packets from the networks layer 110 (step 121). When received packets from the network layer 110, the network control interface 121 will recognize the format of the packets so as to identify the QoS mechanism and distinguish the packets into signaling packets and data packets (steps 212). Then, the network control interface 121 will pass the signaling packets to the configuration controller 123 and pass the data packets to the traffic controller 122 (step 22).

When received a signaling packet, the configuration controller 123 will get the traffic parameters from the packet (step 231). Then, the call admission control 1231 will map or translate the QoS attributes and check the available resource of radio link (step 232). Subsequently, the call admission control 1231 will decide if the call for connection establishment should be admitted according to the obtained information (step 233).

After the call for connection establishment is admitted, the call admission control 1231 will load a corresponding radio module program into the radio module 124 if the corresponding radio link is not established (steps 2331 and 234). Then, the call admission control 1231 will use the loaded radio module program to establish the corresponding radio link (step 235). After that, the call admission control 1231 will check if the radio link is established already according to the status of connection (step 236).

If the radio link is established completely, the call admission control 1231 will use the service manager 1233 to set the traffic controller 122 with corresponding parameters so that the data packets can be delivered orderly according to the requirements of QoS (step 237). On the contrary, if the connection establishment is failure or not admitted by the call admission control 1231, the call admission control 1231 will send a rejecting message to the network layer 110 via the network control interface 121.

On the other hand, after receiving a data packet, the classifier 1221 of the traffic controller 122 will classify the QoS class of the data packet and put the data packet into the specific queue (step 241). Subsequently, the conditioner 1222 of the traffic controller 122 will perform metering, dropping and shaping the packet according to the attributes of the packet and the requirements of QoS (step 242). Then, the scheduler 1223 of the traffic controller 122 will schedule the queues of different classes according the parameters set by the service manager 1233 and pass the packet to the radio module 124 (step 243).

Afterward, the radio module 124 will execute the radio module program to translate the packet into a specific format suited to transmit in the corresponding radio system (step 244). Then, the radio module 124 will pass the packet to a corresponding media access controller of the radio system layer 130 and transmit the packet via a corresponding transceiver of the physical layer 140 (step 245).

Therefore, due to the setting of the traffic control of the radio adaptation layer 120 and the media access control of the radio system layer 130 can be changed repeatedly, the QoS between network layer 110 and the physical layer 140 can be integrated vertically. Besides, since the method or apparatus of the present invention can support the IntServ and DiffServ mechanisms or other QoS mechanisms, the method or apparatus of the present invention can extend the area of QoS to reach the wired ends of the network. If the core network also supports this QoS mechanism, the area of QoS can be further extended to another end of the link and the end-to-end QoS can be reached.

Figure 9:
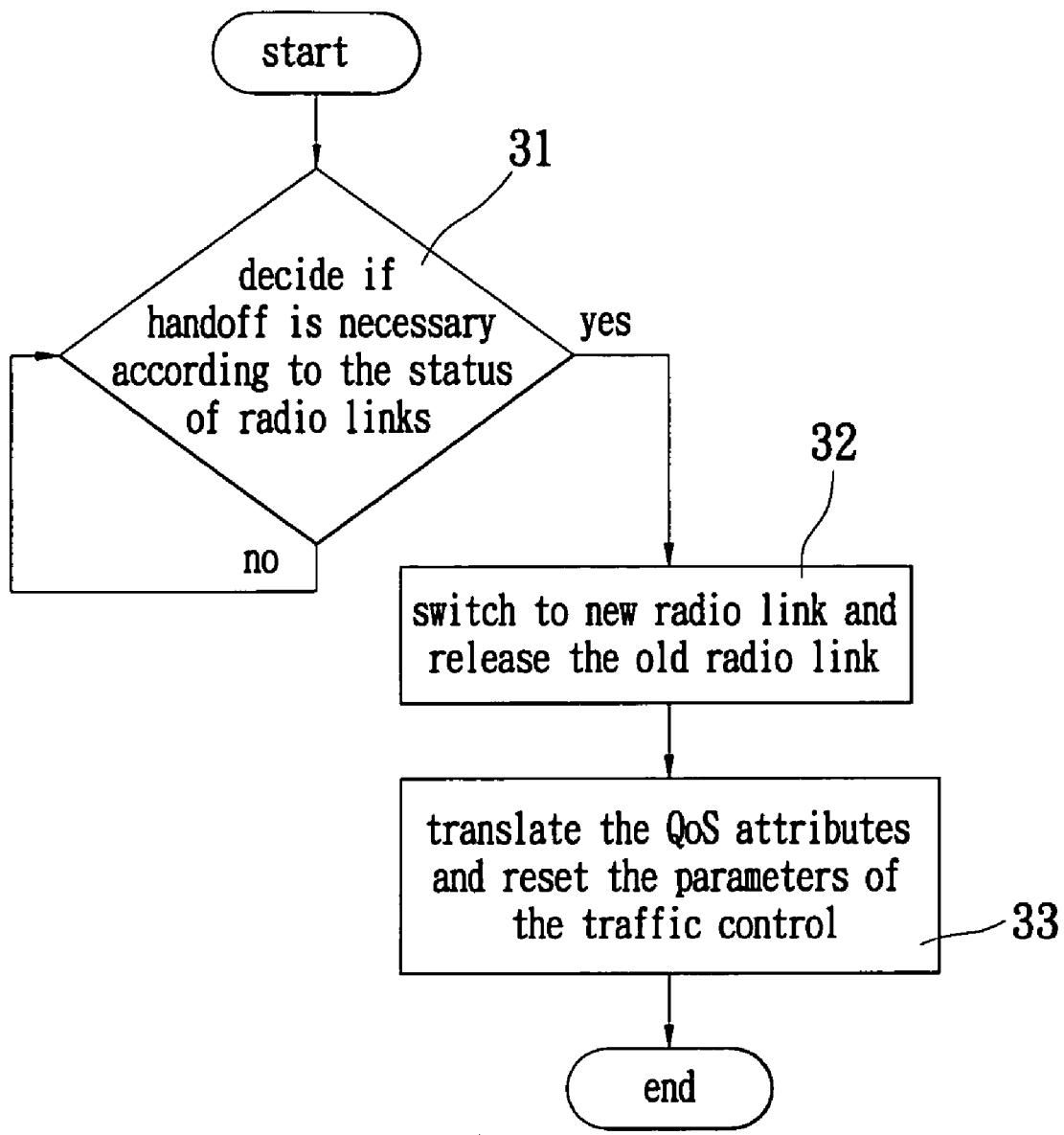
FIG. 9 is an operative flowchart of the seamless handoff process complied with the present invention.

As for the seamless handoff process, please refer to FIG. 9, which is an operative flowchart of the seamless handoff process complied with the present invention. Therein, by employing the radio monitor 1234 to monitor the status of the radio links, the radio system selector 1232 can decide if handoff is necessary (step 31).

If handoff is necessary, the system selector 1232 will search for a possible and suitable radio link via the radio module 124. Once found, the system selector 1232 will use the service manager 1233 to build up this new radio link. Subsequently, the system selector 1232 will perform handoff, i.e. switch to the new radio link, and then release the old radio link (step 32). As established completely, according to the properties of the new radio link, the QoS attributes will be translated and the parameters of the traffic controller 122 will be reset (step 33). In this way, the present or future packets processed in the traffic controller 122 will be transmitted by this new radio link and the connection will not be interrupted and the QoS will not be reduced. Hence, the seamless handoff can be performed.

Figure 10:
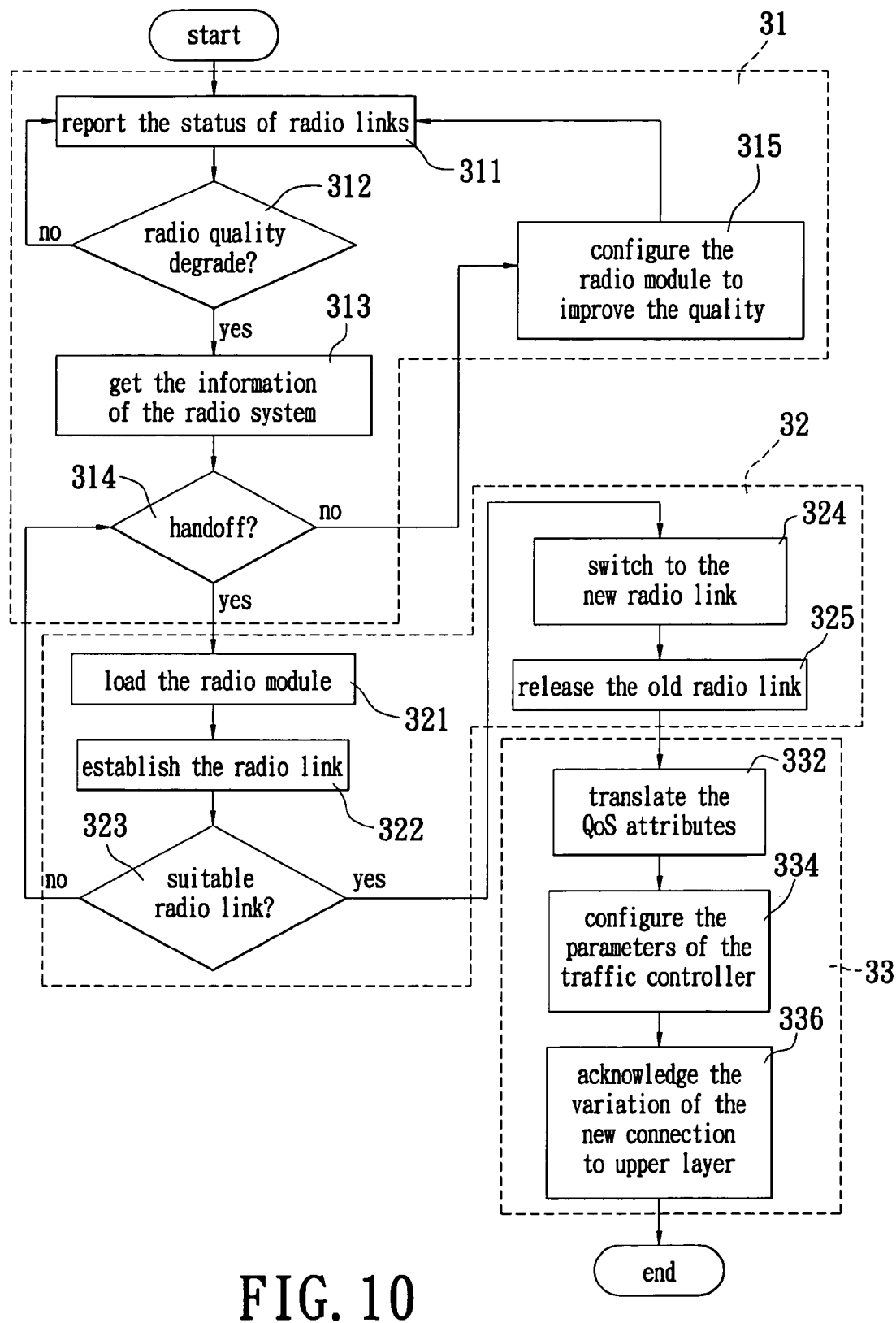
FIG. 10 is a detailed operative flowchart of the seamless handoff process complied with the present invention.

As for the detailed seamless handoff process, please refer to FIG. 10, which is a detailed operative flowchart of the seamless handoff process complied with the present invention. First, the radio monitor 1234 will monitor the status of radio links dynamically, including magnitude and interference of signals and so on, and then report the status to the radio system selector 1232 (step 311). Subsequently, the radio system selector 1232 will determine if the radio quality degrades according to the status reported by the radio monitor 1234 (step 312).

If the radio quality degrades, the radio system selector 1232 will abstract the information of the used radio system from the status reported by the radio monitor 1234 (step 313). According to the information, the radio system selector 1232 can determine if handoff is necessary (step 314). If not necessary, the radio system selector 1232 can improve the quality of the radio link by configuring the radio module 124 (step 315).

However, if handoff is necessary, the radio system selector 1232 will control the radio module controller 1235 to load the radio module program to the radio module 124 (step 321). After loaded, the service manager 1233 will use the radio module program to establish a new radio link (step 322). As established, the radio monitor 1234 will report the status of the radio link to the radio system selector 1232, which will determine if the radio link is suitable (step 323).

As the suitable and usable radio link is found and established, the service manager 1233 will switch to the new radio link (step 324) and release the old radio link (step 325). Then, according to the properties of the new radio link, the QoS attributes will be translated (step 332) and the parameters of the traffic controller 122 will be reset (step 334). Thereby, the packets processed in the traffic controller 122 can be transmitted according to their requirements of QoS. Subsequently, the radio adaptation layer 120 will acknowledge the variation of the new connection to the upper layer, such as the network layer 110, via the network control interface 121 (step 336).

As described above, the seamless handoff process complied with the present invention releases the old radio link and transmits via a new radio link only after the suitable new radio link is established. Hence, the connection won't be interrupted and the QoS won't degrade due to handoff. Thereby, the seamless handoff can be performed.

Figure 11A:
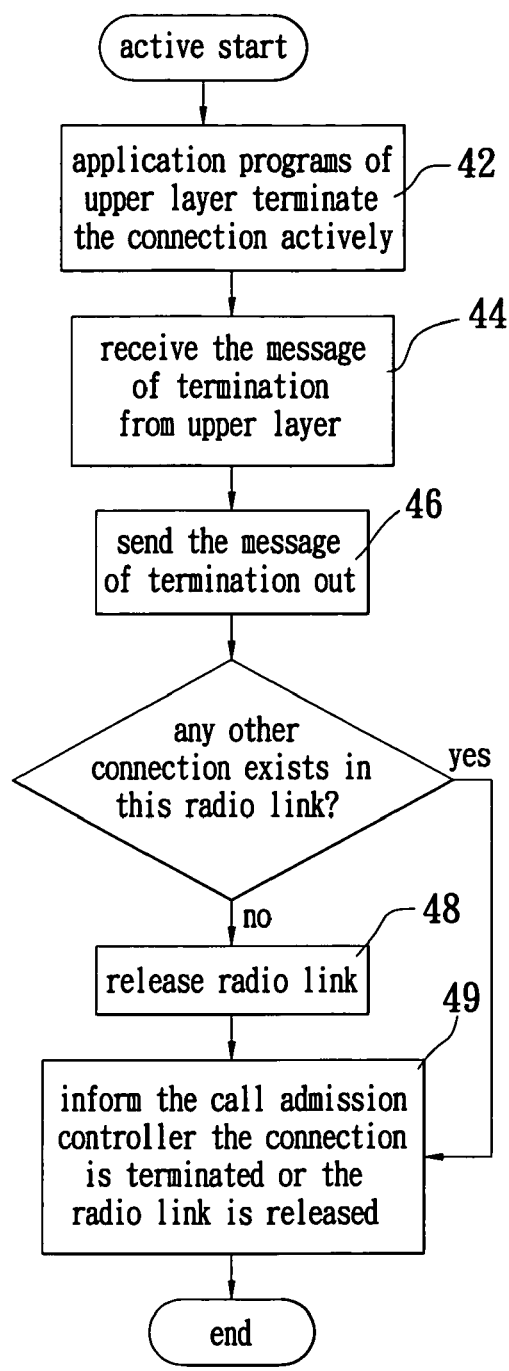
FIGS. 11a and 11b are operative flowcharts of active and passive radio link releasing process complied with the present invention.
Figure 11B:
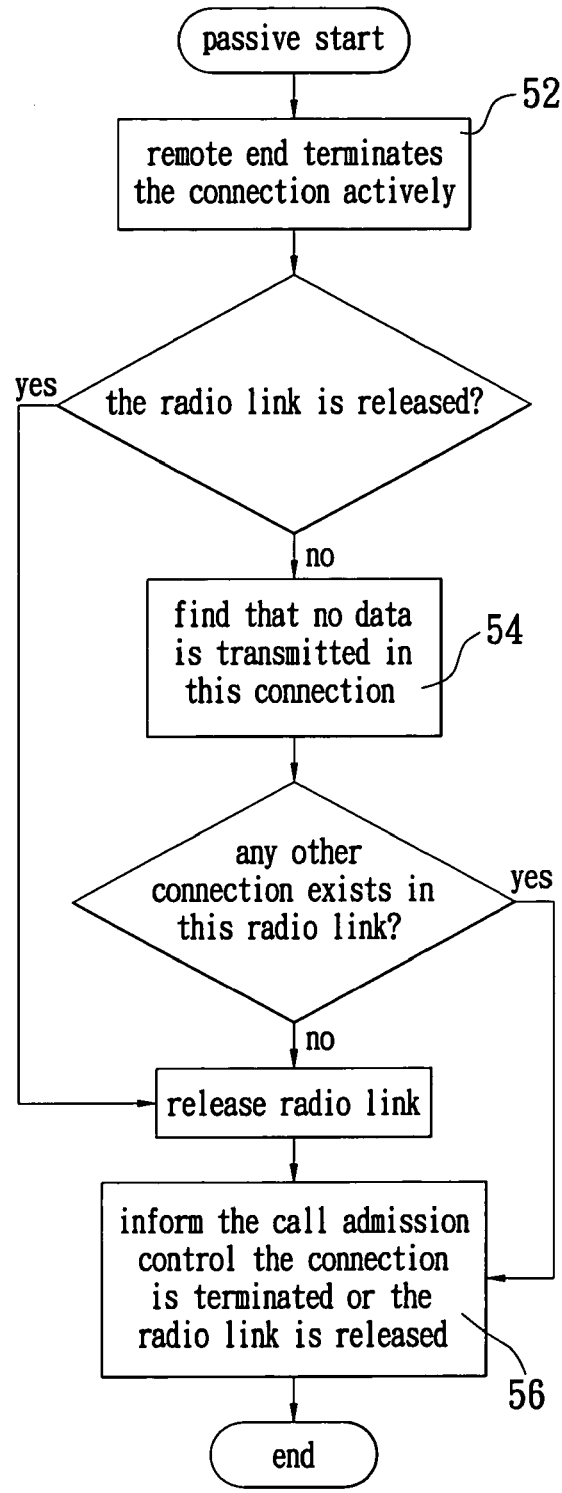

As per the radio link releasing process, please refer to FIGS. 11a and 11b, which are operative flowcharts of active and passive radio link releasing process complied with the present invention. Please refer to FIG. 11a again. When the application programs of the upper layer terminate a connection actively, the application programs will issue a message of termination (step 42). Then, the network control interface 121 will receive this message (step 44). After the traffic controller 122 sends out this message (step 46), the network control interface 121 will determine if any other connections exist in this radio link. If no other connections exist in this radio link, the radio module will release this radio link (step 48) and inform the call admission control 1231 that this radio link is released (step 49). Otherwise, the radio link needn't be released and the radio module will just inform the call admission control 1231 that the connection is terminated.

On the contrary, as shown in FIG. 11b, when the remote end terminates the connection actively (step 52) and the radio link is released, the relative setting of he radio module will be modified to release the radio link and the call admission control 1231 will be informed that the radio link is released (step 56). If the radio link is not released, the traffic controller 122 will find that no data is transmitted in this connection after a period of time (step 54). Then, the traffic controller 122 will determine if any other connections exist in this radio link to transmit data there through. If positive, the radio link needn't be released and the radio module will just inform the call admission control 1231 that the connection is terminated (step 56). Otherwise, the radio link will be released and the radio module will inform the call admission control 1231 that the radio link is released.

Summing up, the present invention proposes a novel apparatus and method for controlling multi-mode radio access, which can provide the integration and guarantee of the QoS, such as IntServ and DiffServ mechanisms, seamless handoff during roaming in different wireless networks and multi-mode reconfigurable mechanism. Hence, the present invention can provide wire-line like QoS guarantee.

Although the present invention has been described with reference to the preferred embodiment thereof, the present invention will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. An apparatus for controlling multi-mode radio access comprising:
    a physical layer;
    a radio system layer connecting with the physical layer for performing medium access control;
    a radio adaptation layer, which connects with the radio system layer, at least comprising:
        a configuration controller used to establish or control at least a radio link according to a signal packet so as to perform seamless handoff within different radio systems and set corresponding traffic control parameters; and
        a traffic controller used to transmit a data packet according to the traffic control parameters and requirements of quality of service (QoS) of the data packet; and
    a network layer for passing the data packet and signal packet to the radio adaptation layer, the network layer using an Internet protocol (IP) so as to make the apparatus able to roam within the different radio systems and support QoS mechanisms.

2. The apparatus as claimed in claim 1, wherein the IP is a mobile IP.

3. The apparatus as claimed in claim 1, wherein the QoS mechanisms comprise a IntServ or a DiffServ mechanism.

4. The apparatus as claimed in claim 1, wherein the physical layer comprises a first reconfigurable transceiver and a second reconfigurable transceiver for establishing radio links within the different radio systems.

5. The apparatus as claimed in claim 1, wherein the physical layer only has a first reconfigurable transceiver or a non-configurable transceiver.

6. The apparatus as claimed in claim 1, wherein the radio system layer comprises at least a media access controller corresponding to a radio module.

7. The apparatus as claimed in claim 6, wherein the media access controller is a wireless local area network (WLAN) media access controller, a 3G protocol stack, a 802.16 media access controller or a bluetooth media access controller.

8. The apparatus as claimed in claim 1, wherein the radio adaptation layer further comprises a network control interface to recognize a format of a packet sent from the network layer.

9. The apparatus as claimed in claim 1, wherein the configuration controller comprises:
   a call admission control for managing present wireless network resources of the apparatus; and
   a radio system selector connecting with the call admission control for determining if it is necessary to perform the seamless handoff according to a status of a radio link.

10. The apparatus as claimed in claim 9, wherein the configuration controller comprises:
   a service manager connecting with the call admission control for setting the traffic control parameters, and establishing or correcting the status of the radio link;
   a radio monitor connecting with the call admission control and the radio system selector for monitoring the status of the radio link; and
   a radio module controller connecting with the radio system selector for loading a radio module program to a radio module.

11. The apparatus as claimed in claim 10, wherein the configuration controller comprises:
   a configuration control interface connecting with the service manager, the radio monitor and the radio module controller for providing an unified control interface between the configuration controller and the radio module.

12. The apparatus as claimed in claim 1, wherein the traffic controller comprises:
   a classifier for classify the data packet and deliver the classified data packet to a corresponding queue;
   a conditioner connecting with the classifier for controlling the classified data packet in the queue;
   a scheduler connecting with the conditioner for scheduling the queue according to the traffic control parameters; and
   a traffic control interface connecting with the scheduler for providing an unified control interface between the traffic controller and a radio module.

13. The apparatus as claimed in claim 12, wherein the conditioner comprises:
   a meter for measuring and counting according to data attributes of the data packet;
   a dropper for dropping the data packet according the requirements of QoS; and
   a shaper for retarding a transmission of the data packet according the requirements of QoS.

14. The apparatus as claimed in claim 1, wherein the radio adaptation layer further comprises:
   a radio module connecting with the configuration controller and the traffic controller for converting the data packet to a specific radio system format before sending the data packet to the radio link, providing the radio link with QoS in an one-to-one or one-to-multiple manner and performing a monitoring of management and power saving to make the configuration controller able to modify the radio module.

15. The apparatus as claimed in claim 14, wherein the radio module comprises at least a radio module corresponding to the radio systems.

16. The apparatus as claimed in claim 15, wherein the radio module is a WLAN module, a 3G module, a 802.15 module or a bluetooth module.

17. A packet-transmitting method for controlling multi-mode radio access comprising:
   recognizing a format of a received packet;
   determining if the received packet is a signaling packet;
   passing the received packet to a configuration controller if the received packet is the signaling packet, establishing a corresponding radio link according to parameters of the signaling packet and present network resources, and setting corresponding parameters of a traffic controller to fit predetermined requirements of QoS; and
   passing the received packet to the traffic controller if the received packet isn't the signaling packet but a data packet, controlling a quality of a connection according to predetermined parameters of traffic control and then sending out the data packet orderly.

18. The method as claimed in claim 17, wherein the step of passing the received packet to the configuration controller further comprises:
   abstracting a traffic parameter from the signal packet;
   translating QoS attributes and checking available resource of radio link;
   loading a usable radio module program to establish the corresponding radio link if a connection is admitted;
   setting the corresponding parameters of the traffic controller after the radio link is established completely; and
   converting the signaling packet to a specific radio system format and then sending the signaling packet out.

19. The method as claimed in claim 18, wherein the step of passing the received packet to the configuration controller further comprises:
   rejecting connection establishment and sending out a message of rejection if the connection is not admitted or the radio link isn't able to establish completely.

20. The method as claimed in claim 17, wherein the step of passing the received packet to the traffic controller further comprises:
   classifying the data packet and delivering the classified data packet to a corresponding queue;
   measuring, dropping or retarding the data packet;
   scheduling a plurality of queues; and
   converting the data packet to a specific radio system format for transmitting in a corresponding radio system; and sending the data packet out.

21. A seamless handoff method for controlling multi-mode radio access comprising:
   determining if handoff is necessary according to a status of a present radio link, further comprising:
     reporting the status of the present radio link;
     determining if a quality of the present radio link degrades;
     obtaining an information of a radios system and determining if the handoff is necessary; and
     modifying a setting of a radio module to improve the quality of the present radio link if the handoff isn't necessary;
   switching to a new radio link;
   releasing an old radio link;
   translating QoS attributes for mapping parameters; and
   setting parameters of a traffic controller to fit the new radio link.

22. The method as claimed in claim 21 comprising following steps before the step of switching:
   loading a radio module program and setting its parameters;
   establishing the new radio link by employing the radio module program; and
   determining if the new radio link is suitable.

23. The method as claimed in claim 21 comprising a step as below after the step of setting:
   informing an upper layer of a variation of the new radio link.

24. A radio link releasing method for controlling multimode radio access comprising:

issuing a message for releasing a radio link as an application program of an upper layer terminates a connection actively;

passing the message for releasing the radio link to an end of a network;

releasing the radio link by a radio module if a number of other connections existing in the radio link is zero and informing a call admission control that the radio link is released; and informing the call admission control that the connection is terminated if the number of other connections existing in the radio link is not zero.

25. The method as claimed in claim 24 comprising a step as following when the application program of the upper terminates the connection passively: informing the call admission control that the radio link is released if the radio module issues that the radio is released.

26. The method as claimed in claim 25 comprising following steps if the radio module doesn't issue that the radio is released:

discovering that the radio is released by the radio module after a period of time;

releasing the radio link by the radio module if a number of other connections existing in the radio link is zero and informing the call admission control that the radio link is released; and informing the call admission control that the connection is terminated if the number of other connections existing in the radio link is not zero.

* * * * *